United States Patent [19]

Hom et al.

[11] 3,898,662
[45] Aug. 5, 1975

[54] RADAR TARGET SIMULATOR USING NO ELECTRICAL CONNECTION TO RADAR

[75] Inventors: William R. Hom, Baltimore; Frederick J. Jaklitsch, Lutherville; Raymond H. Bennighof, Phoenix, all of Md.

[73] Assignee: The United States of America as represented by the Secretary of the Navy, Washington, D.C.

[22] Filed: Aug. 16, 1968

[21] Appl. No.: 753,221

[52] U.S. Cl. .................................. 343/18 E; 35/10.4
[51] Int. Cl.² ........................................ H04K 3/00
[58] Field of Search .................... 35/10.4; 343/18 E

[56] References Cited
UNITED STATES PATENTS

| | | | |
|---|---|---|---|
| 2,653,222 | 9/1953 | Williams et al. | 343/18 E |
| 3,019,433 | 1/1962 | White | 343/18 E |
| 3,113,268 | 12/1963 | Horak | 343/18 E |
| 3,171,125 | 2/1965 | Butler | 343/18 E |
| 3,277,476 | 10/1966 | Sabin et al. | 343/18 E |
| 3,320,349 | 5/1967 | Pollack et al. | 343/18 E |

*Primary Examiner*—T. H. Tubbesing
*Attorney, Agent, or Firm*—Raymond I. Tompkins; John W. Pease; John F. Miller

[57] ABSTRACT

A device for simulating a target on the display screen of a victim radar which may be remotely located from the device. No electrical connections between the device and the victim radar are required. Therefore the device may be surreptitiously used on enemy or non-cooperating radar.

6 Claims, 15 Drawing Figures

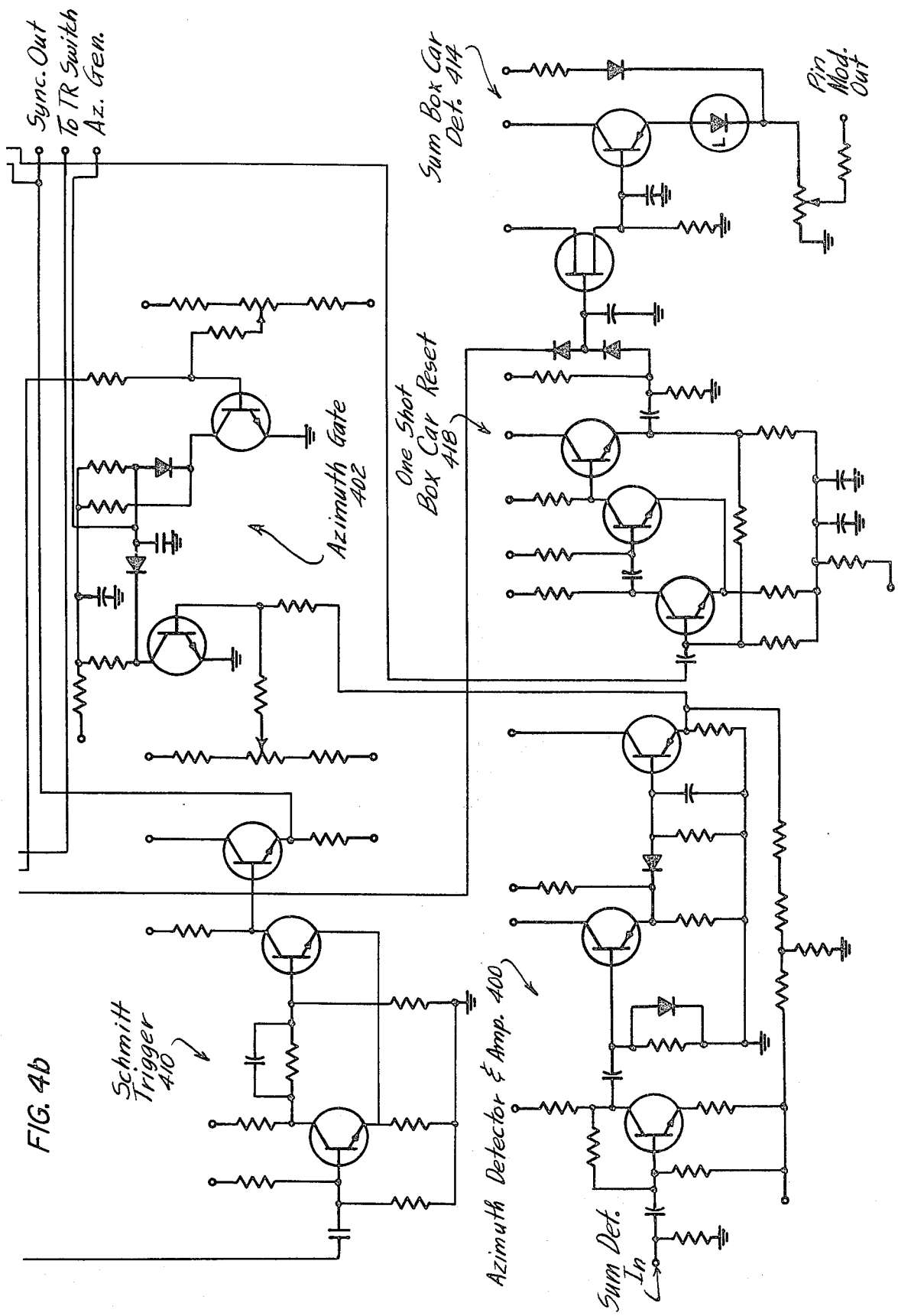

RADAR TARGET SIMULATOR USING NO ELECTRICAL CONNECTION TO RADAR

BACKGROUND OF THE INVENTION

The invention is in the field of radar simulating devices. Prior art devices of this type were capable of simulating a target on the screen of a radar system but required electrical connections between the simulating device and the radar system. Thus they cannot be used effectively against enemy radar or against non-cooperating radar except under restricted conditions.

SUMMARY OF THE INVENTION

A radar target simulator which can transmit a signal which causes a simulated target to appear on a victim radar's display screen. No electrical connections to the radar are necessary. The invention picks up all the information required from the radiated signal of the victim radar by means of a pair of spaced apart microwave antennas. The signal picked up by the two antennas is processed to determine the instant when a target pulse should be transmitted by the simulator so that the simulated target appears on the victim radar's screen at a desired azimuth and range. An antenna pattern leveling circuit is provided to cause the simulated target to be of correct intensity regardless of the position of the radar's antenna pattern.

BRIEF DESCRIPTION OF THE DRAWING

FIG. 5b shows a timing pulse generator which furnishes control signals to the target azimuth generator of FIG. 5a.

DESCRIPTION OF THE PREFERRED EMBODIMENT

Figure 1:
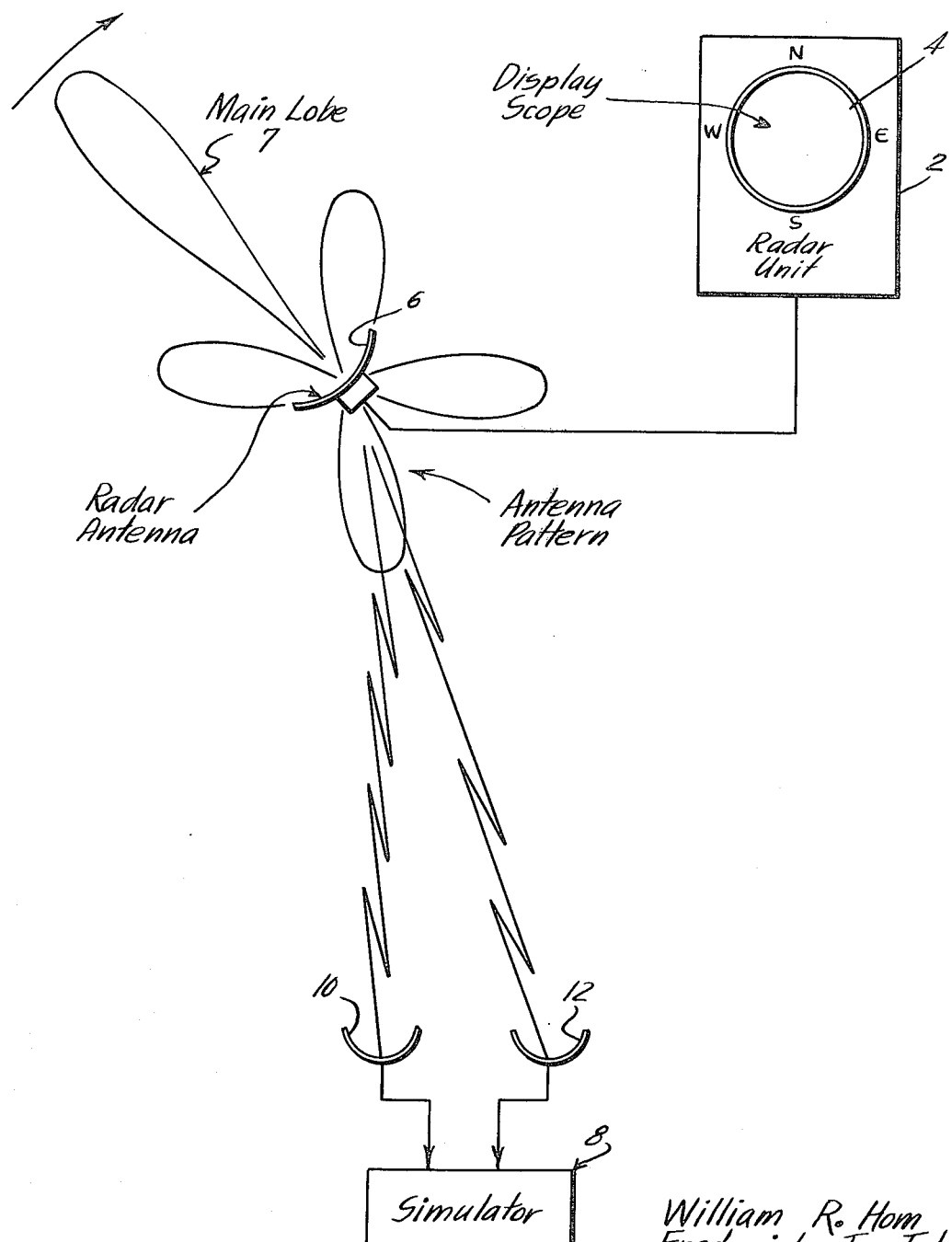
FIG. 1 shows the spatial relationships between the invention and a victim radar.

A ready understanding of the invention may be had from the following discussion of FIG. 1 which shows the spatial relationships between the simulator 8 and a victim radar unit 2. Radar unit 2 has a display scope 4 and a rotating antenna 6. The simulator 8 may be located a considerable distance from radar antenna 6 and radar unit 2. Simulator 8 has no direct electrical connection to radar 2 but picks up information from the rotating beam or pattern of antenna 6 through its own antennas 10 and 12. This information enables simulator 8 to transmit signals which cause a simulated target to appear on the display scope 4 of radar 2. Thus the operator of simulator 8 can confuse the operator of radar unit 2 with simulated targets indistinguishable from real targets. Simulator antennas 10 and 12 are spaced approximately four feet apart so that the instant when the rotating main lobe 7 of the radar antenna pattern is centered between them can be detected. Successive detections establish the rotational period of radar antenna 6. This information is processed to determine the instant a target signal should be transmitted from simulator antennas 10 and 12 to simulate a target at a selected azimuth and range on radar display scope 4.

Figure 2:
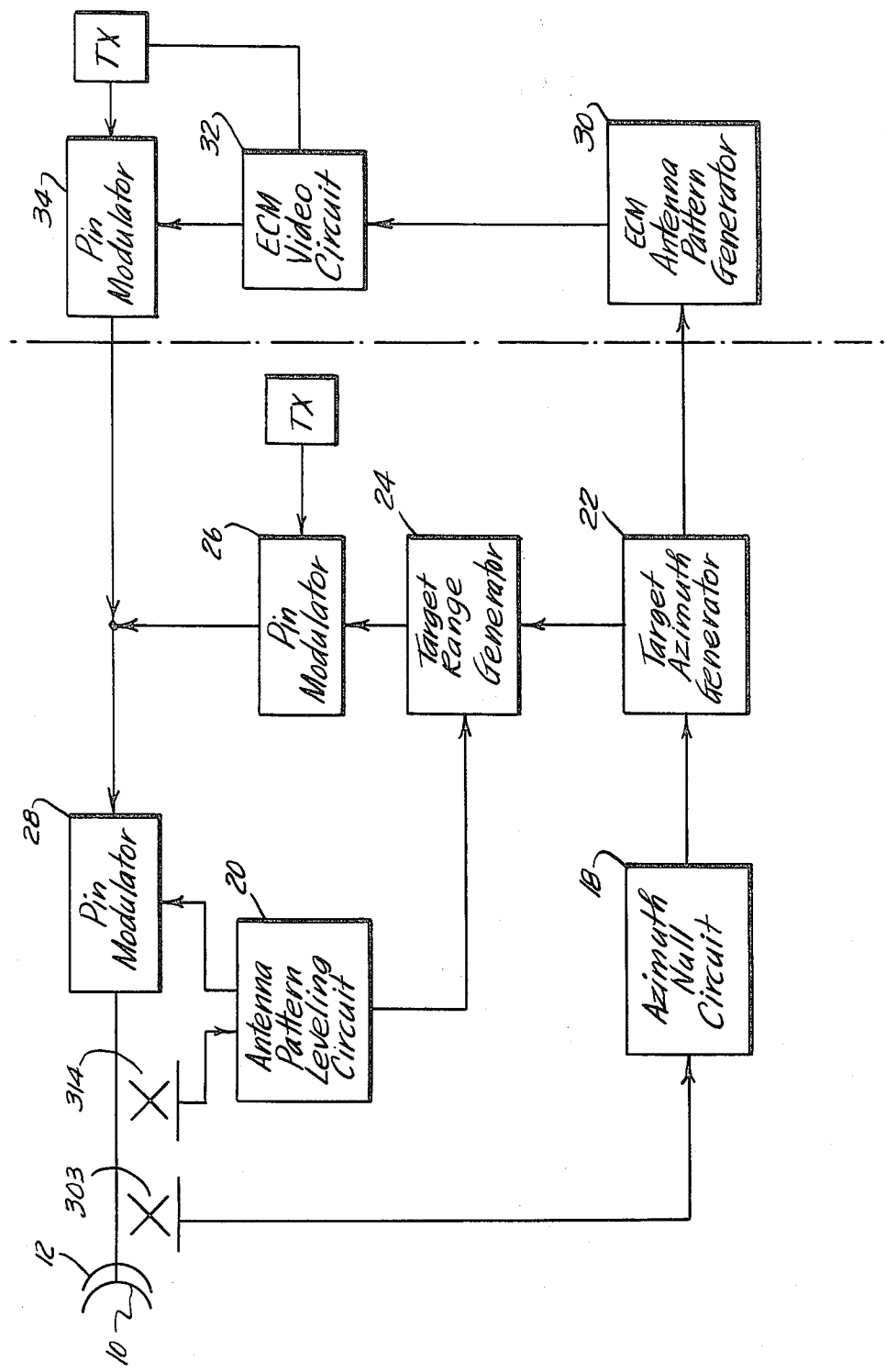
FIG. 2 is a block diagram showing the functional interrelationships of the principal components of the invention.

A broad understanding of the invention may be had from the following discussion of FIG. 2, which is a block diagram showing the functional interrelationships of the main components of simulator 8. Antennas 10 and 12 are coupled by couplers 303 and 314 to an azimuth null circuit 18 and an antenna pattern leveling circuit 20. The function of azimuth null circuit 18 is to generate a signal when the rotating main lobe 7 of the pattern of radar antenna 6 (FIG. 1) sweeps across simulator antennas 10 and 12. This information is fed from azimuth null circuit 18 to a target azimuth generator 22 which determines a period within which simulator 8 can transmit a target signal to cause a simulated target to appear on radar scope 4 at a selected azimuth. Target azimuth generator 22 forwards this information to a target range generator 24 which divides the target azimuth period into smaller periods, one of which can be selected to cause the simulated target on radar display scope 4 (FIG. 1) to appear to be located at a particular range. A signal from target range generator 24 is forwarded to a pin modulator 26 and from 26 to a pin modulator 28 which furnishes the simulator output signal to antennas 10 and 12. The purpose of antenna pattern leveling circuit 20 is to "level" or regulate the amplitude of the simulator output signal so that the simulated target on radar scope 4 will have the correct intensity regardless of azimuth. The magnitude of the simulator signal required will vary with the position of radar antenna 6.

Elements 30, 32, and 34 are not part of this invention. They are part of a larger apparatus of which the invention is a part and are shown in FIG. 2 because in the detailed circuit diagrams of FIGS. 3–7, certain circuit elements common to the invention and the larger apparatus are interconnected.

Figure 3:
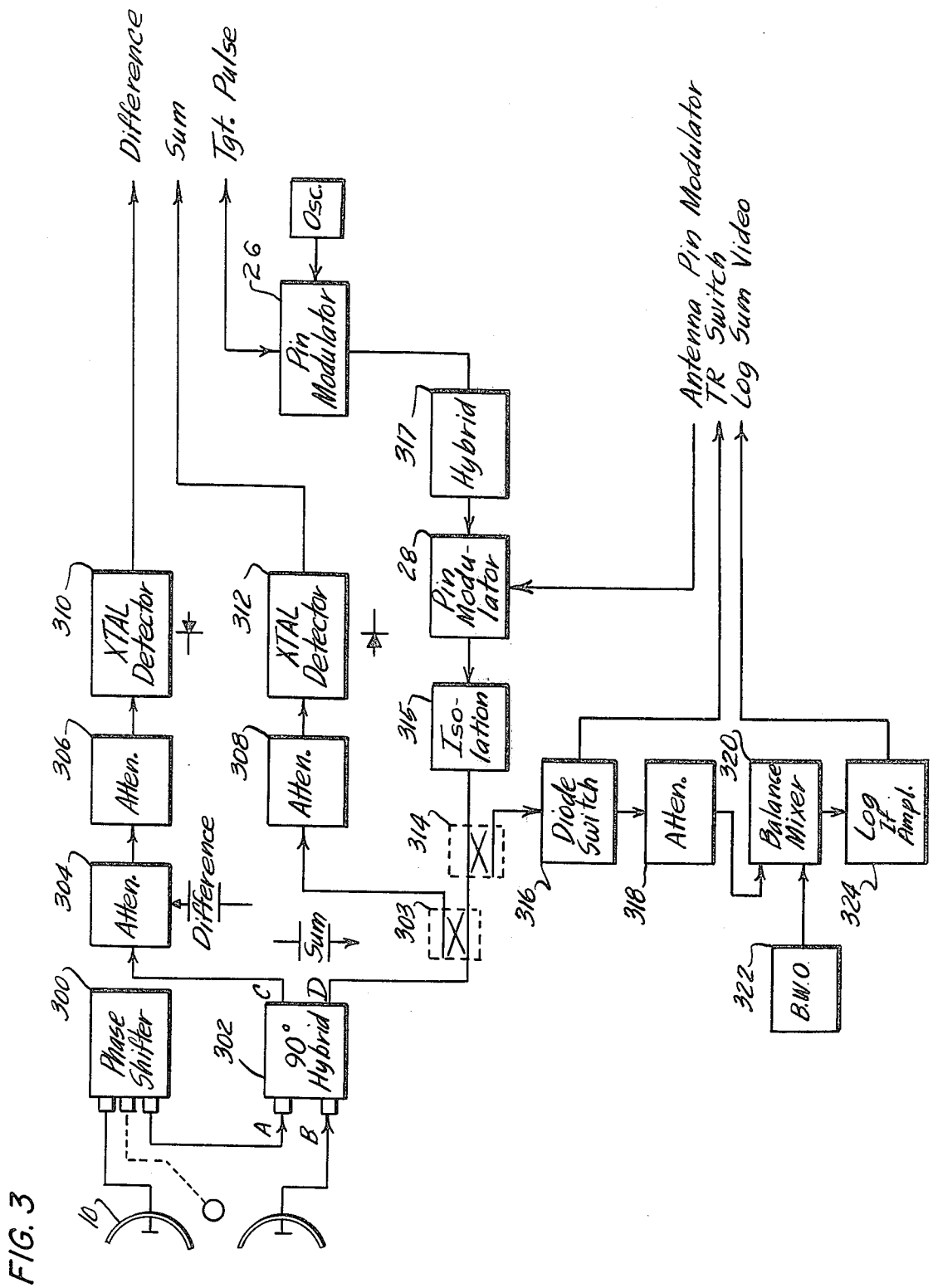
FIG. 3 is a block diagram showing the functional interrelationships of receiving and transmitting elements of the invention.

A complete understanding of the invention may be had from FIGS. 3–7, which show the apparatus of the invention in detail. Known commercially available elements such as those in FIGS. 3 and 5 are shown as blocks in the drawings. Circuit schematics are shown for elements peculiar to the invention.

Beginning now with FIG. 3, the structure of azimuth null circuit 18 (FIG. 2) will be described. When the main lobe 7 of the radar antenna pattern (FIG. 1) is in the vicinity of the simulator antennas 10 and 12, each antenna will develop an output signal. When the main lobe 7 is midway between the simulator antennas, an equal signal is present in both. The output of antenna 10 goes through an adjustable phase shifter 300 to an input of a four port hybrid 302. The output of antenna 12 goes directly to an input of four port hybrid 302 as shown.

In hybrid 302 the power at each input divides so that half appears at each output. Simultaneously, a 90° phase shift is introduced in half of each input and no phase shift in the other. When the adjustable phase shifter in series with one antenna signal is set to approximately 90°, the following condition exists: Inputs A and B are 90° apart in phase. In coupling over to outputs C and D, the internal power splits and phase shifts cause one output to be the sum of both inputs and the other output to be the difference of both inputs. This means that the difference output is a sharp null and the sum output is a maximum when the main lobe is midway between the simulator antennas. The hybrid 302 is followed by attenuators 304, 306, and 308, to set up proper power levels and by crystal detectors 310 and 312 in the difference and sum output leads to change RF bursts (main bang transmissions) into video pulse envelopes.

Figure 4A:
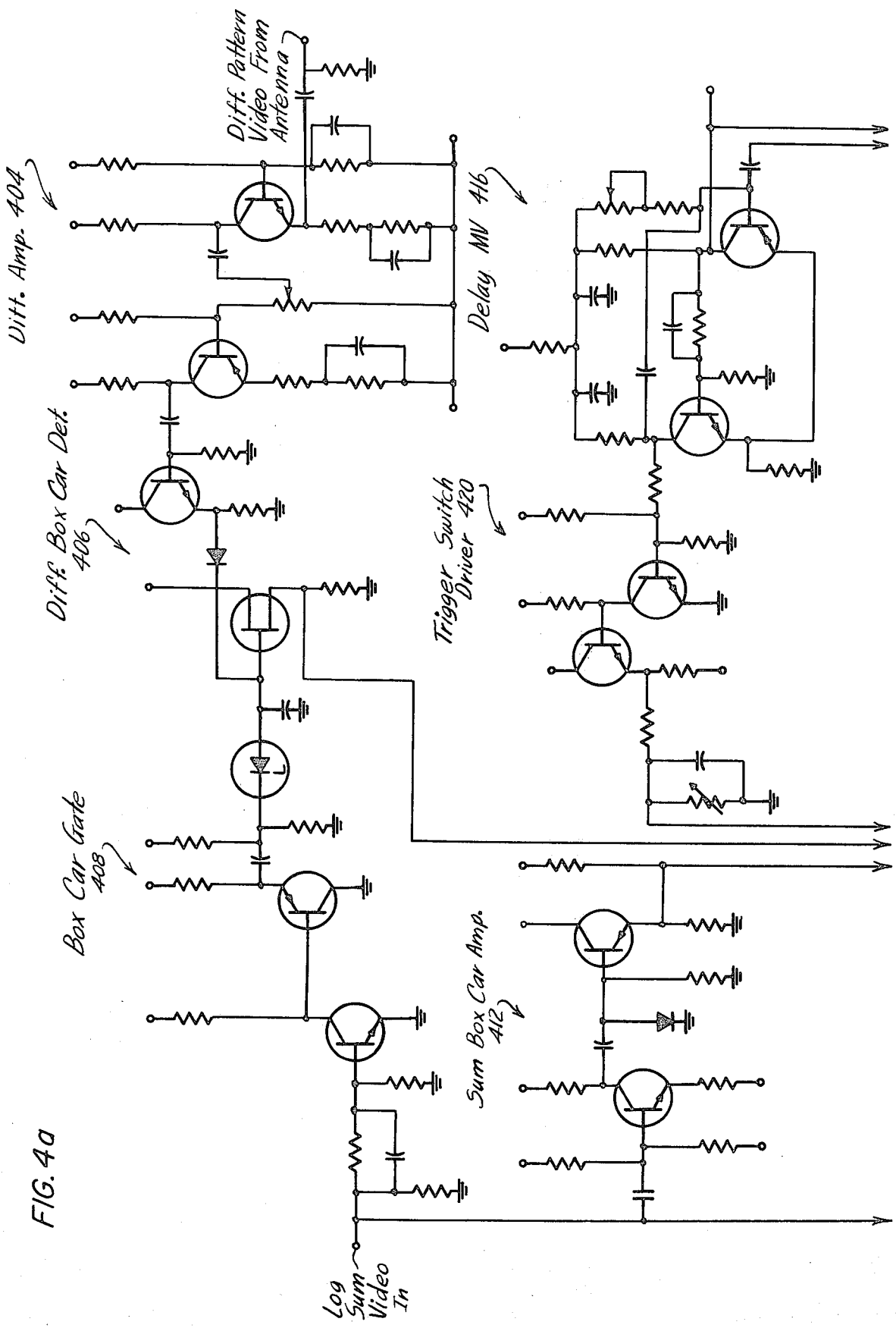
FIG. 4a and 4b combined in the manner shown in FIG. 4c show a circuit schematic of the logic circuits of the invention.

The sum and difference signals are sent to the circuits shown in FIGS. 4a and 4b for further processing. The sum signal goes to an azimuth detector and amplifier 400 (FIG. 4b) which changes the video pulse train into a D.C. envelope. It then becomes one-half of the input to an azimuth gate 402. The difference signal enters a difference amplifier 404 (FIG. 4a) before being applied to a difference box car detector 406. Box car detector 406 is essentially a very high impedance peak detector. The time constant of 406 is so long that a second input from a box car gate 408 is needed to discharge the detector just before each difference pulse is applied. If this were not done, the output of the detector would not follow the deep and narrow null which occurs on the difference line from detector 310 of FIG. 3. The output of detector 406 is a DC envelope corresponding to the difference signal and becomes the second half of the input to the azimuth gate.

The azimuth gate 402 is a two-legged "and" circuit with a threshold adjustment on each input side. Two inputs are required to avoid ambiguity. The desired signal on the difference line is a null or minimum signal. But this condition exists both when the main lobe splits the two antennas and also when the main lobe is so far away that neither antenna receives much signal. By using the sum signal as another input, the undesired condition of the missing main lobe can be eliminated. Gate 402 will look for nulls only when a large signal is present in the sum line from detector 312 of FIG. 3. The adjustments in this circuit allow the operator to compensate for various amplitude signals and gain changes of various transistors.

The output of azimuth gate 402 is a pulse which occurs within milliseconds of the instant the center of the main lobe splits the simulator antennas. This is the azimuth null signal developed in the circuitry shown as block 18 of FIG. 2 and is used to put the simulated target at any arbitrary azimuth on the radar PPI. Logic circuits are used to select target azimuths by dialing in the desired number.

Now referring to antenna pattern leveling circuit 20 (FIG. 2), this circuit is necessary so that a simulated target will appear at the same intensity on the radar scope 4 whether the simulator is "looking" at the radar's main lobe or some back lobe 40 DB down. In the present system, antenna pattern leveling is accomplished independently of any signal being transmitted by the simulator. In this way signals can be generated at the simulator exactly as they are desired to be seen by the radar without regard to antenna pattern.

This technique requires a separate pin modulator 28 (FIGS. 2 and 3) which is used only for antenna pattern leveling. In a simplified explanation the antenna pattern leveling circuit works as follows: As the antenna 6 (FIG. 1) rotates, the simulator 8 always receives some appreciable amount of power through simulator antennas 10 and 12. Several detector circuits in the simulator reduce the RF pulses to a varying DC level which is the antenna pattern of that radar and can be displayed as such on an X–Y plotter if desired. The antenna pattern voltage is applied as the modulating signal to the pin modulator 28 which controls the amount of attenuation of the device. When the main lobe passes the simulator a large signal is detected. It causes a large voltage to be applied to the pin modulator and the attenuation is increased. When the back lobes are detected, smaller amounts of signal cause a smaller attenuation in the pin modulator. If the pin modulator is in series with a constant power signal source, and with the correct scale factor in the detector circuits, the simulator output will be the exact inverse of the antenna pattern. The radar receiver circuits will see the sum of the two which results in a constant signal level at all azimuths. If another pin modulator 26 is added in series with the first at the simulator 28, any signal applied to it will be faithfully reproduced at the radar. That is, a small signal at the simulator will cause a small signal at the radar and a large signal at the simulator will cause a large signal at the radar. In all cases, the position of the radar antenna has been compensated for by the antenna pattern leveling circuit.

Antenna pattern leveling circuit details are shown in FIGS. 3, 4a, and 4b. A 20 DB coupler 314 taps off part of the sum signal coming through a coupler 303 from the antennas 10 and 12 (FIG. 3). The signal goes through a diode switch 316 which opens up when the simulator is in a transmit mode. This keeps the simulator from confusing internally generated signals with the radar signals. Next the signal passes through an adjustable attenuator 318 used to set the proper signal levels for a mixer 320. The sum signal and L.O. signal from an oscillator 322 combined in mixer 320 produce a 30 MC output of main bang pulses. The signal from mixer 320 then goes to a log IF amplifier 324 which amplifies and detects the pulses. This amplifier was chosen for two important reasons: First, an 80 DB dynamic range can be covered with only moderate excursions on the output signal level. Secondly, the pin modulator 28 used for antenna leveling is a log device, therefore the driving signal must be logarithmic in nature to preserve the desired linear relationship between received radar signals and transmitted simulator signals.

The resultant log sum video signal from 324 is applied to the circuits of FIGS. 4a and 4b where it performs several functions. First it operates a box car gate 408 and the difference box car detector 406 already discussed in the explanation of the azimuth null circuit 18 of FIG. 2. It also goes to a Schmitt trigger amplifier 410 where each pulse is shaped and used as a $T_o$ time reference sync pulse for ranging and internal gating. It is also applied to a sum box car amplifier 412 to increase its amplitude before it is applied to the sum box car detector 414. Sum box car detector 414 is another peak detector used to convert a train of varying pulses into a DC envelope with the same variations. This circuit also suffers from the problem that large sudden increases can be faithfully reproduced but due to the long time constant, a large sudden decrease cannot.

This problem can be cured by making sure that the detector is empty just before each new main bang pulse arrives. Therefore every pulse, no matter how small, always increases the detector output. A sync pulse from the above mentioned Schmitt trigger amplifier 410 initiates a delay multivibrator 416 which changes state, remains in that state for 2000 microseconds, then returns to its normal state. The trailing edge of the waveform from delay multivibrator 416 ($T_o$ + 2000 microseconds) triggers a one shot box car reset 418. This is a 20 microsecond pulse which discharges the box car detector 414 to zero. The interval of 2000 microseconds was chosen so this operation would occur after the end of one sweep but before the beginning of the next. These parameters are dependent on the maximum range and rep rate, which vary from radar to radar, so the time is adjustable to accommodate several types of systems.

The 2000 microsecond waveshape from multivibrator 416 is forwarded to a TR switch driver circuit 420 to inhibit the simulator receiving circuits immediately after a pulse is received. This eliminates spurious signals which might confuse the antenna pattern leveling circuit 20 (FIG. 2). At the end of the time interval, the simulator receiving circuits are activated again to await the next main bang pulse. The same waveshape is used in other circuits to suppress all simulator transmissions when a signal is expected from the radar.

The output of the sum box car detector 414 is a waveshape which during the time between $T_o$ and $T_o$ + 2000 microseconds is a DC level proportional to the power from the radar. This signal is applied to the antenna pin modulator 28 (FIG. 2) which operates in such manner that more voltage results in more attenuation. When used in series with a constant level signal source, the output is a power level which is the inverse of the radar antenna pattern. As the antenna rotates, the simulator aways sends back just enough signal to compensate for all variations of the front, back, and side lobes. The fact that this is called a leveling circuit does not imply that the level of the simulator signal is constant, rather that the signal seen at the receiver terminals of the radar is constant. When this circuit is correctly adjusted, a constant CW source at the simulator will produce an even intensity noise or "grass" level at all ranges and all azimuths on the radar PPI. With further modulation of the source, any display desired could be presented to the radar operator.

Now referring to target azimuth generator 22 of FIG. 2, this components generates a pulse indicating that the radar antenna azimuth is the same as the desired azimuth for the simulated target. The only inputs to generator 22 are: one, an azimuth pulse (generated by the azimuth null circuit 18 of FIG. 2 when the radar antenna is pointing at the simulator), and two, the simulated target's azimuth measured in degrees of antenna revolution from the point where the antenna points to the simulator. This value is inserted using manually operated switches.

With only the above inputs, the target azimuth generator must "compute" the time lag between the azimuth null pulse and the time when the antenna is at the simulated target's azimuth, and generate an output pulse when the time lag has expired.

The following example will demonstrate the principles incorporated in the design of the target azimuth generator. Consider two oscillators, one oscillating at a frequency 360 times the frequency of the other. Further assume these oscillator frequencies to be 160 KC and 444 cycles/sec. Next a device for counting each cycle from the 444 CPS oscillator is required and can be designated as an "$\mp$RPM counter", the significance of this title being shown presently. Now the radar antenna will be assumed to be rotating at 4 RPM, or one revolution each 15 seconds. Since the radar antenna points at the simulator once every revolution, an azimuth pulse will be generated four times a minute or once every 15 seconds. If the RPM counter is started from zero when an azimuth pulse is received and stopped when the next azimuth pulse is received, the counter will have accumulated a count of 444 × 15 or 6660.

Figure 5A:
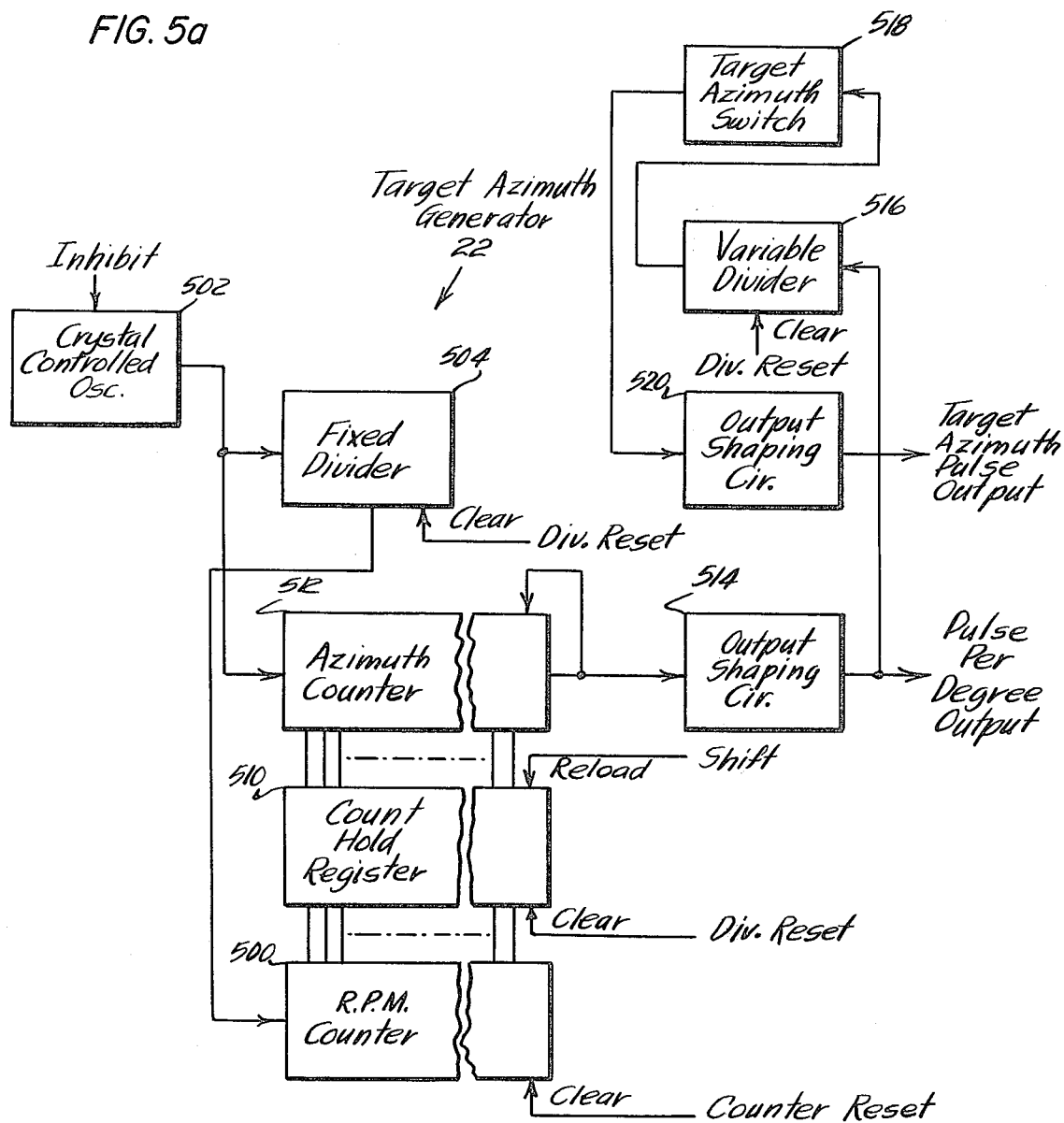
FIG. 5a is a block diagram of the target azimuth generator 22 of FIG. 2.

This much of the circuit can now be related to the block diagram of the target azimuth generator, FIG. 5a. The RPM counter 500 is shown at the bottom of FIG. 5a. The 444 CPS oscillator is comprised of a 160 KC oscillator 502 routed through a fixed divider 504 which produces one output pulse for every 360 input pulses or an output frequency of 444 cycle/sec. When the azimuth null pulse is received by an input shaping circuit 506 (FIG. 5b), a counter reset signal is generated by a timing pulse generator 508 which clears the RPM counter 500 to zero. Then an inhibit signal is released by generator 508 which enables the 160 KC oscillator 502, thereby allowing the RPM counter 500 to start counting at 444 counts per second. When the next azimuth null pulse is received, the inhibit signal is generated by 508 which stops the 160 KC oscillator. Therefore, between the start of the inhibit and the start of the counter reset, a count (6660 in our example) representing the antenna rpm is present in the RPM counter 500.

Since the count will be destroyed by a counter reset signal from 508, a register 510, called a "count hold register", is provided to save the count for use in other circuits in the target azimuth generator. Two timing pulses occur between the start of the inhibit pulse and the start of the counter reset pulse. These pulses are a divider reset pulse and a shift pulse, and are used to clear the count hold register 510 and to copy the count in the RPM register 500 to the count hold register 510 respectively.

It has been shown that a count can be generated which is directly proportional to the antenna revolution rate, and this count can be saved for additional use. Now the high frequency oscillator 502 (160 KC) can be used to generate a pulse for every degree of antenna revolution. If an "azimuth counter" 512 is connected to the output of the high frequency oscillator 502, it will achieve any particular count 360 times faster than the RPM counter, since the frequency of the high frequency oscillator is 360 times the frequency of the low frequency oscillator. Now in this example, every time the azimuth counter 512 counts from zero to the count in the count hold register or 6660, the antenna has rotated on degree.

The only point neglected in the preceding explanation is how the comparison is made between the count in the count hold register 510 and the count in the azimuth counter 512 to determine when they are equal. No actual comparison is made, but a unique feature of binary arithmetic is utilized to obtain the effect of a comparison. The bits expressing a value in binary are reversed (complimented) in a register, it takes as many counts to completely fill up the bit positions (set them all to the "1" condition) as it did to achieve the original value. For example, 101 represents the number 5 in binary, and therefore, it takes five counts to get to 101 in binary from zero. If 101 is complimented, the result is 010. If five more counts are added the result is 011, 100, 101, 110, 111. Thus, after five counts, all the bit positions have been filled. To utilize this feature of binary arithmetic, the value in the count hold register 510 is loaded (in a complimented condition) into the azimuth counter 512. Then the azimuth counter counts at its 160 KC rate until all the bit positions are filled. When the filled condition is sensed, a pulse is sent to a "pulse per degree" output shaping circuit 514 and the compliment of the value in the count hold register is again transferred to the azimuth counter.

So far it has been possible to generate a number proportional to the antenna revolution rate from the azimuth pulse input, and to generate a pulse for every degree of antenna revolution by using an oscillator 360 times faster than the original oscillator. The pulse per degree output from 514 is used by three circuits in the target azimuth generator which generate output pulses when the antenna reaches the azimuth of a simulated target. These circuits are a "variable divider" 516, a "target azimuth switch" 518, and an "output shaping circuit" 520.

The variable divider 516 is a counter which is designed to count in binary coded decimal instead of straight binary, so that the output is compatible with target azimuth switch 518. Binary coded decimal is a format which allocates four binary digits (bits) to represent each decimal digit. For example, 01100001 represents the decimal number 97 in binary, and 10010111 represents the same number in binary coded decimal (1001 = 9, 0111 = 7). The target azimuth switch 518 is constructed so that the switch contacts form an "and" gate sensitive to the binary coded decimal number corresponding to the value which may be set on the switch manually.

The variable divider 516 is cleared each time an azimuth pulse is received, by the divider reset signal from 508, and then counts the pulses from 514 which represent degrees of antenna revolution derived from the azimuth counter 512 until the manually set target azimuth is reached. At this point the "and" gates comprising the switch 518 send a pulse to the output shaping circuit 520 which in turn generates a target azimuth pulse output signal.

Figure 5B:
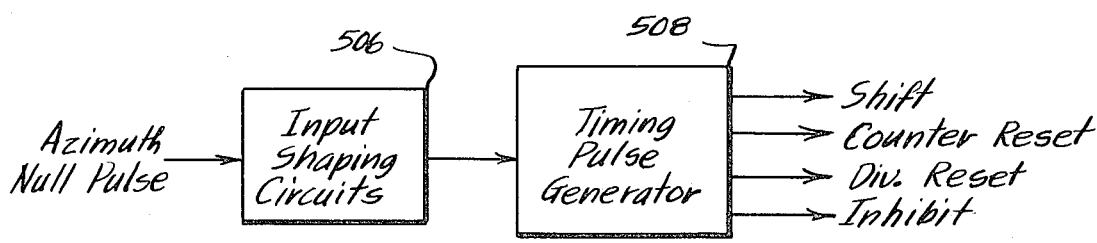
Figure 6A:
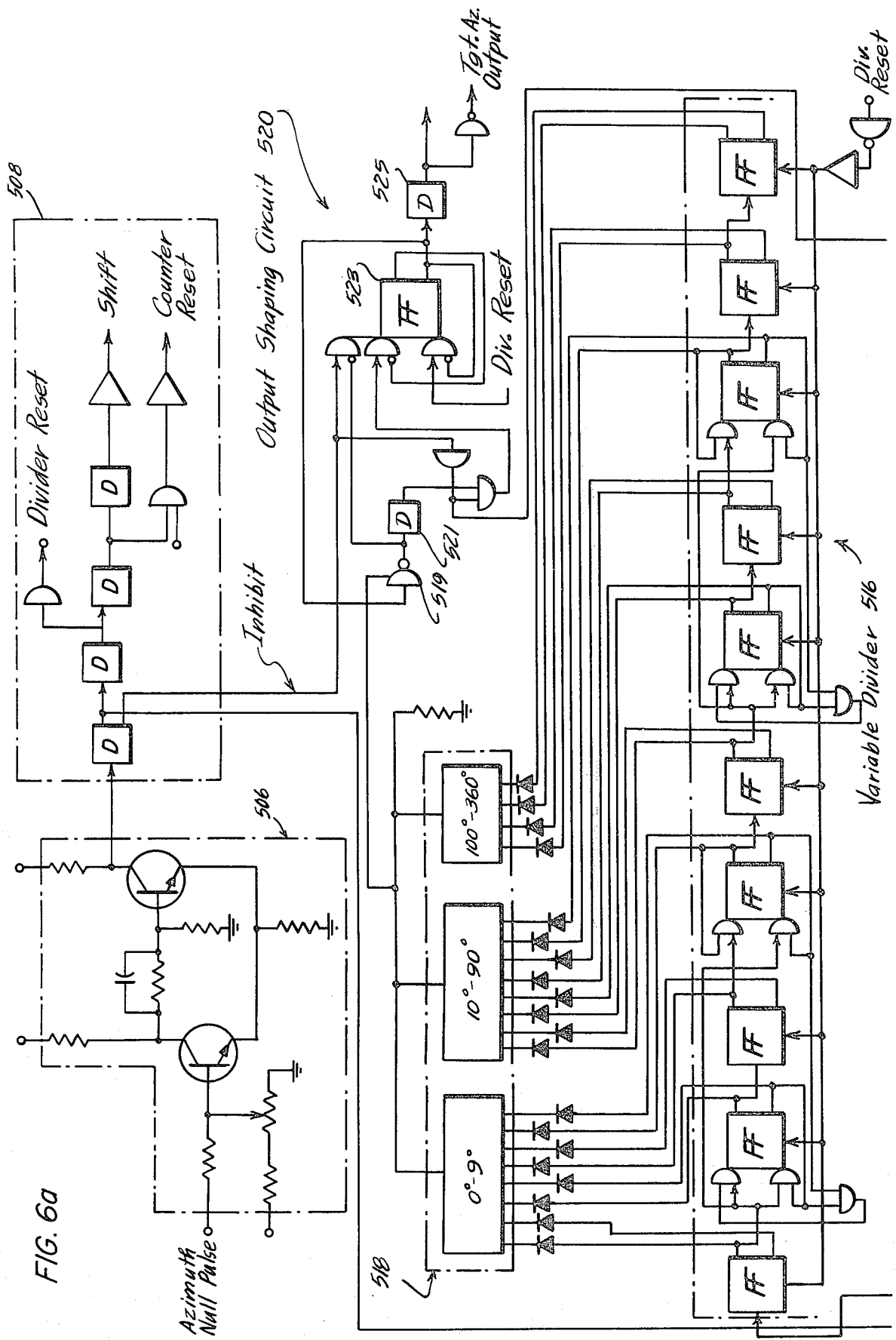
FIGS. 6a and 6b combined as shown in FIG. 6c show a circuit schematic of the target azimuth generator of FIG. 5a and FIG. 2.
Figure 6B:
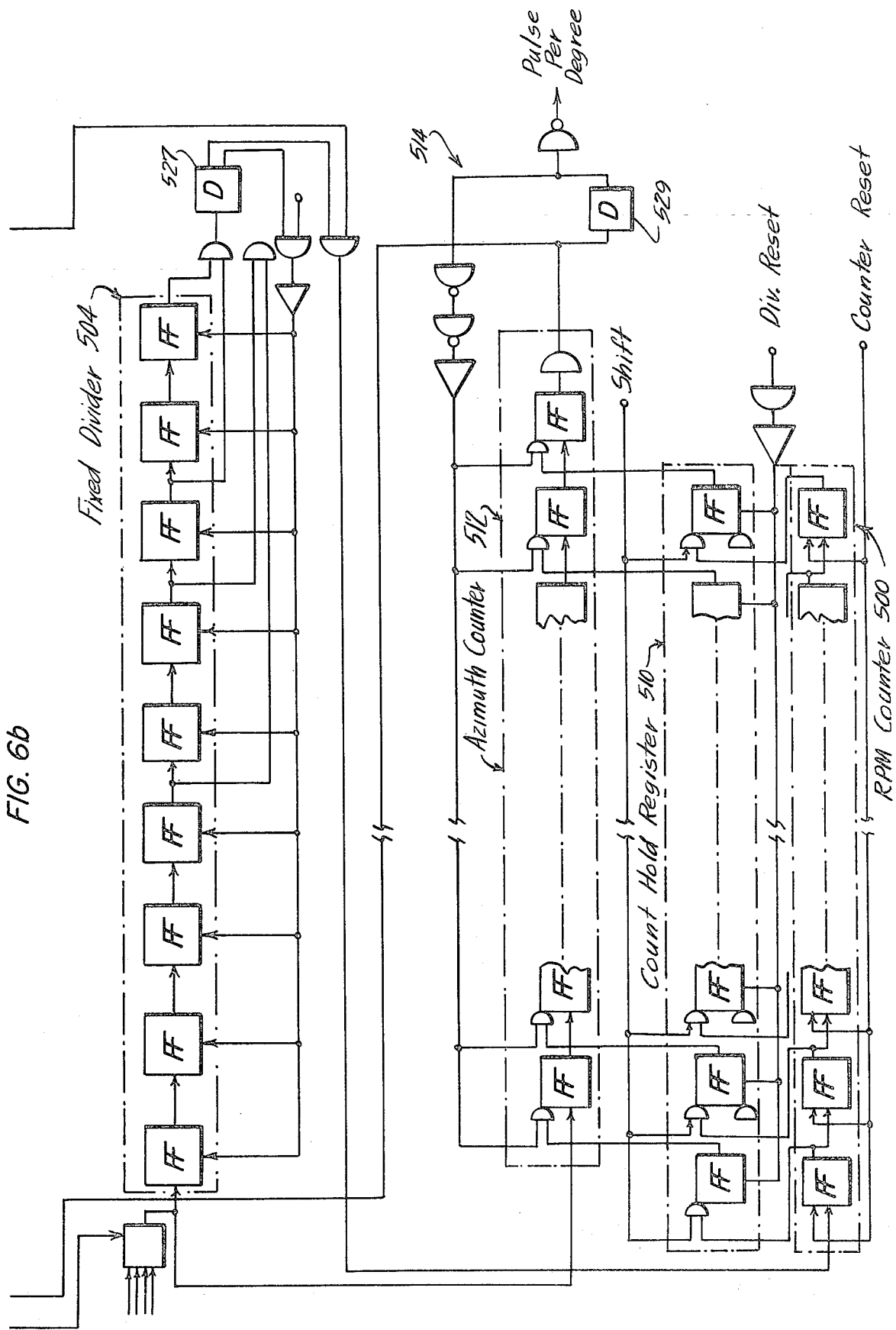
Figure 6C:
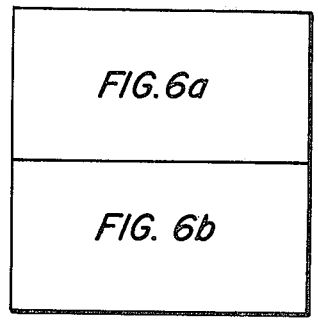
Figure 7D:
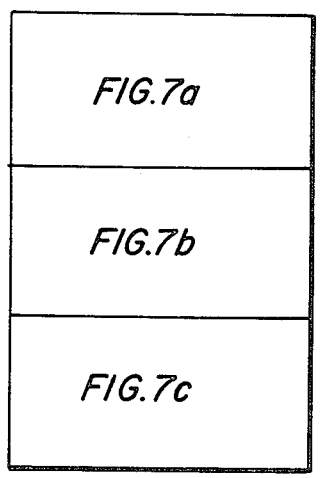

FIGS. 6 and 6a show the detailed circuitry that implements the block diagram of FIGS. 5a and 5b. The following discussion will relate the two. The input shaping circuit 506 is a conventional Schmitt trigger which is used to establish the trigger level and to square up the input azimuth pulse. The output of the Schmitt trigger is routed through four delay flaps D (monostable multivibrators) which comprise the "timing pulse generator" 508 and generate the inhibit, divider reset, shift, and counter reset signals. The last three of these signals utilize either "nand" gates or power drivers to acquire sufficient drive capability.

The variable divider 516 is a ten flip flop counter which utilizes two "nand" gates to implement the binary coded decimal counting capability. Both output sides of each flip flop are routed through diodes to switch contacts in target azimuth switch 518. The diodes and switches form "and" gates. The output signal from switch 518 which occurs when the count in variable divider 516 equals the number which has been manually preset in 518 by the operator is routed through a "nand" gate 519 for drive capability and a delay flop 521 for shaping before setting the inhibit azimuth input flip flop 523. The transition of this flip flop causes a delay flop 525 to generate the target azimuth output pulse and also sends a signal back to the "nand" gate 519 to prevent the passage of additional target azimuth pulses from target azimuth switch 518 until the next divider reset signal resets the inhibit azimuth input flip flop 523. This is required even though both sides of all counter stages in variable divider 516 are monitored. A false count may be seen mometarily during the transition time required for an input pulse to toggle all the flip flops in sequence. A path is also provided from 519 to 523 to generate an output immediately upon receipt of the azimuth pulse whenever a target azimuth of zero degrees is desired. All of the above described circuitry from the target azimuth switch to target azimuth pulse output is denoted as "output shaping circuit" 520 in FIGS. 5a.

The fixed divider 504 is a nine stage binary counter with a gating structure to determine when the count of 360 has been reached. This gating structure triggers a delay flop 527 which in turn resets the counter through a power driver and provides a pulse to increment the rpm counter 500. The azimuth counter 512 is a fifteen flip flop binary counter which receives as its input the compliment of the contents in the count hold register 510. This is accomplished by connecting the input of the azimuth counter flip flops to the reset side of the count hold register. When the last stage of the azimuth counter goes from one to zero (immediately after the register fills up), a delay flop 529 is triggered which in turn generates the pulse per degree output. An increment pulse is forwarded to the variable divider 516 and a signal to azimuth counter 512 causes the compliment of the count hold register 510 to be reloaded into the azimuth counter.

The count hold register is a fifteen stage binary register. Wiring is provided for clearing the register with the divider reset pulse and copying the contents of the rpm counter with the shift pulse. The only remaining block is the RPM counter 500 which is implemented as a fifteen flip flop binary counter which is reset by the divider reset pulse from 508.

In summary, the target azimuth generator receives an azimuth null pulse from which it generates a pulse for every degree of antenna revolution by use of two oscillator frequencies. The pulse per degree is used both as an output and to generate a target azimuth pulse coincident with the instant when the radar antenna 6 is pointing at the simulated target.

Figure 7A:
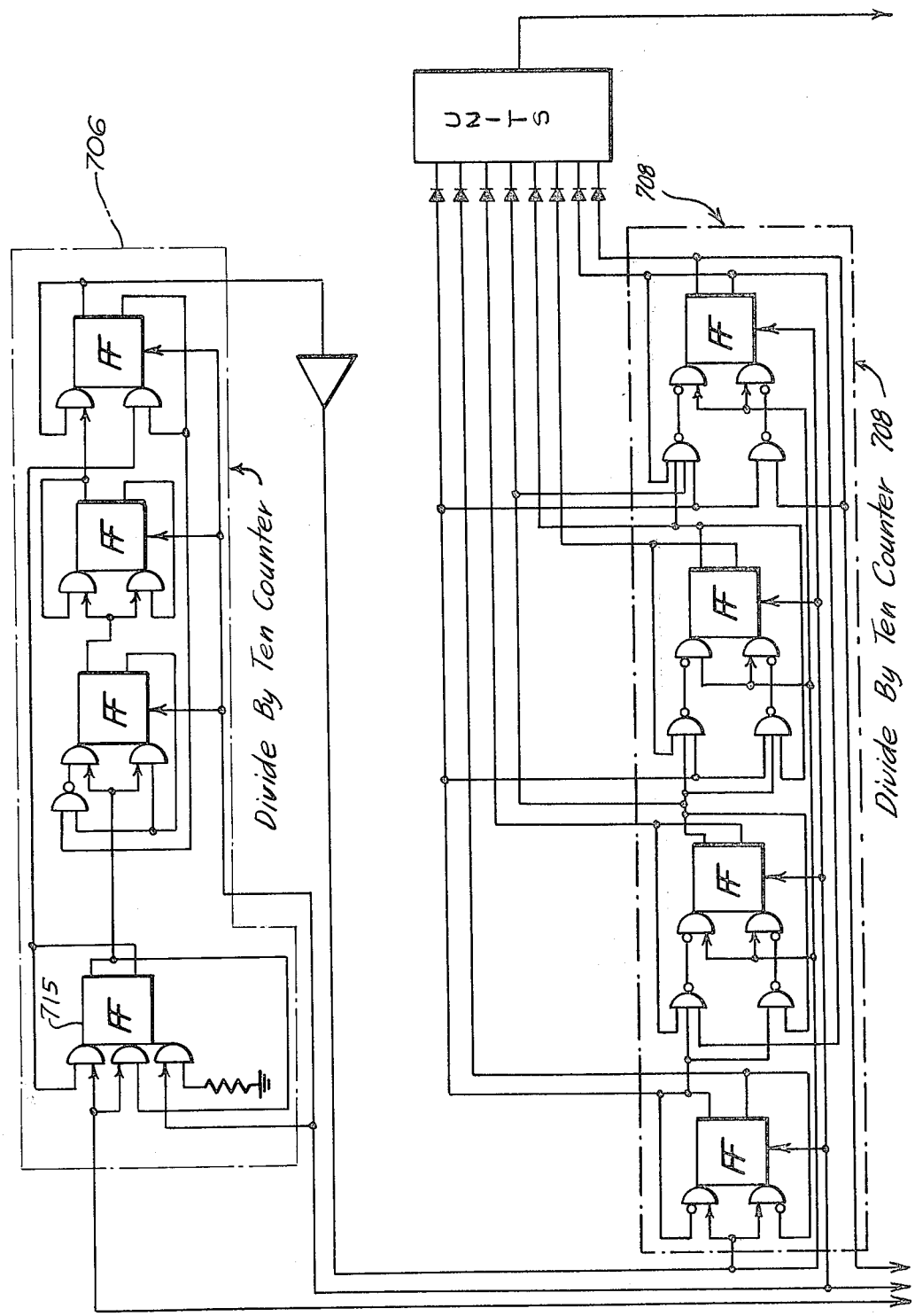
FIGS. 7a, 7b, and 7c combined as shown in FIG. 7d show a circuit schematic of target range generator 24 of FIG. 2.
Figure 7B:
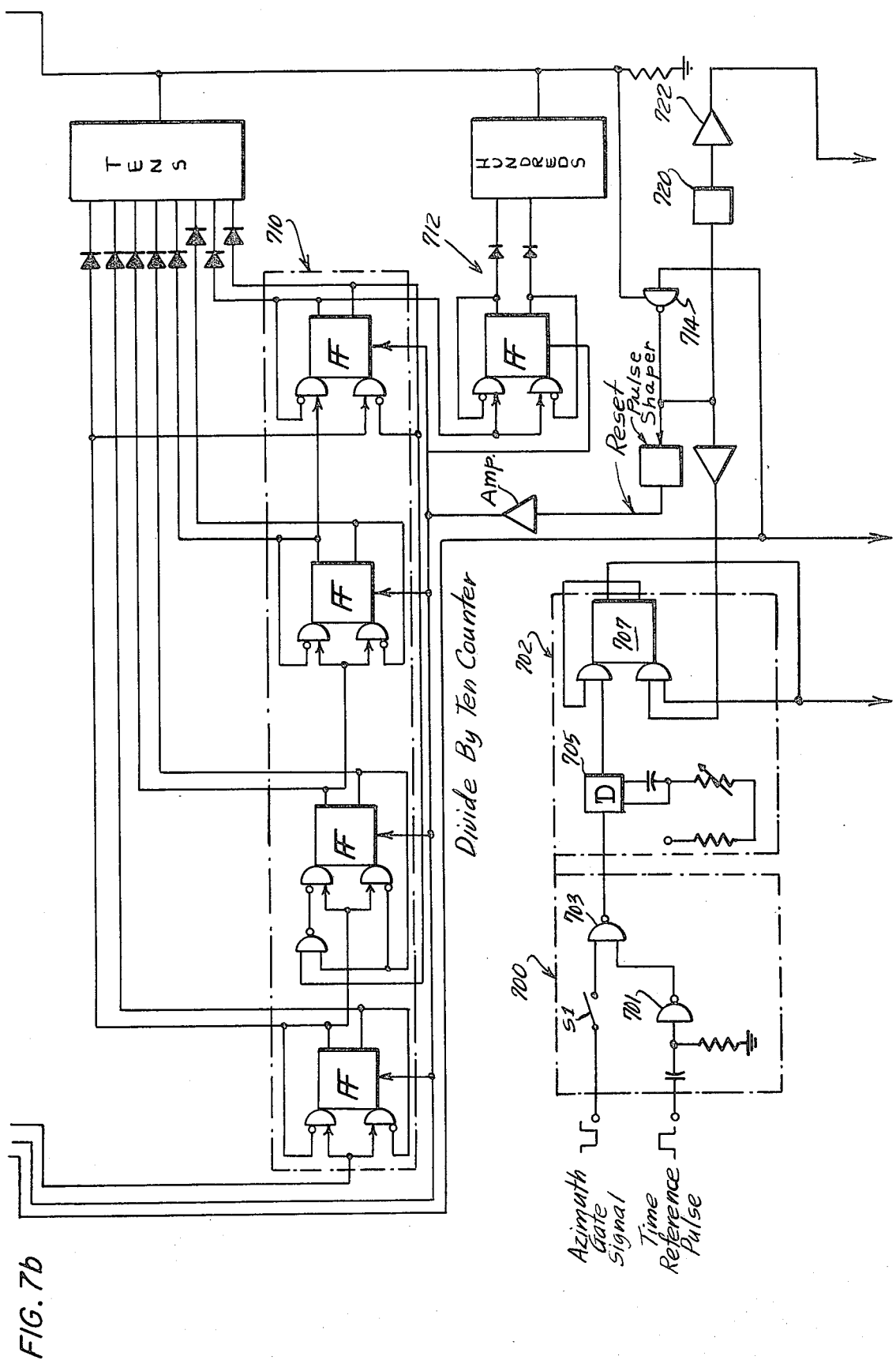
Figure 7C:
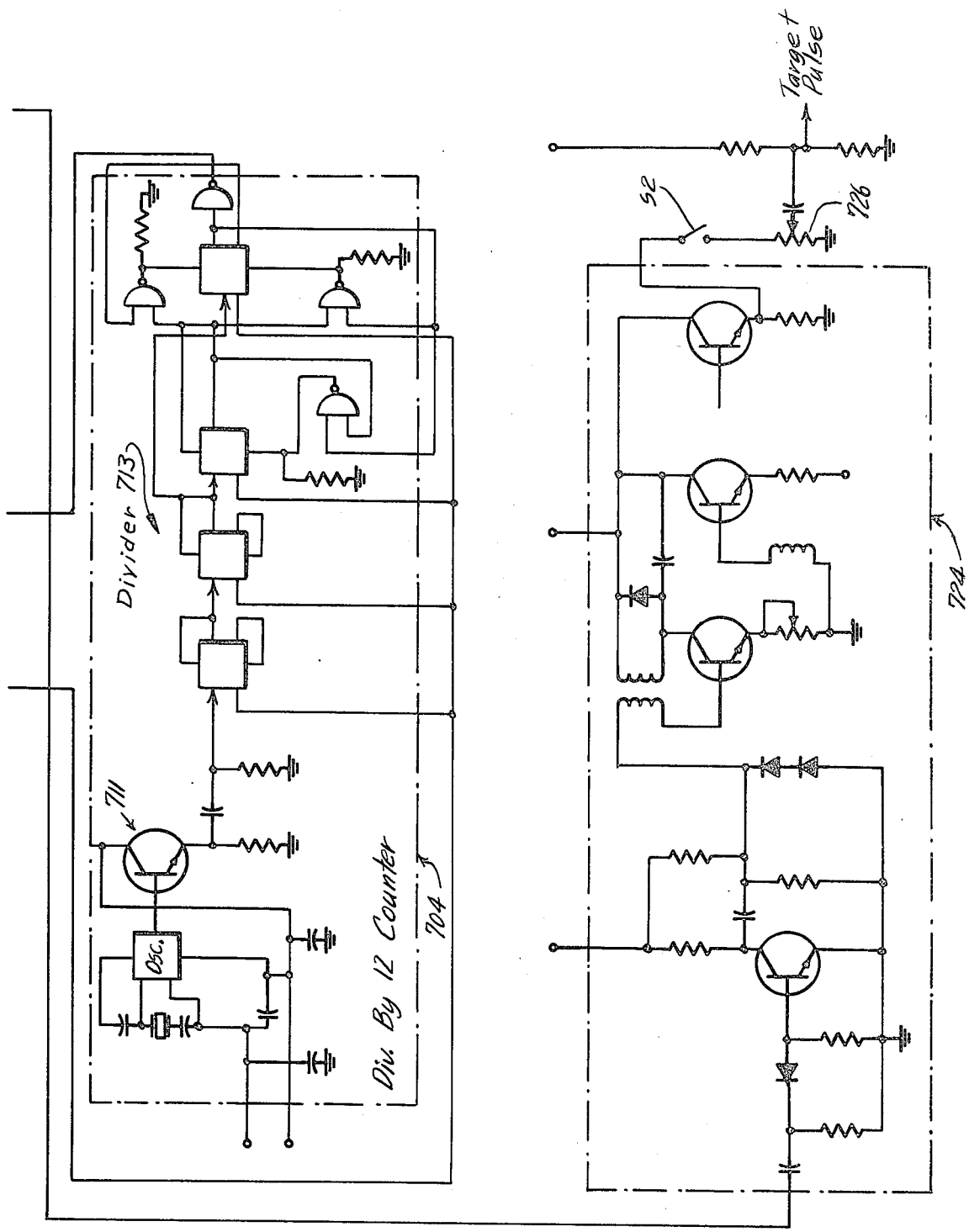
Figure 4C:
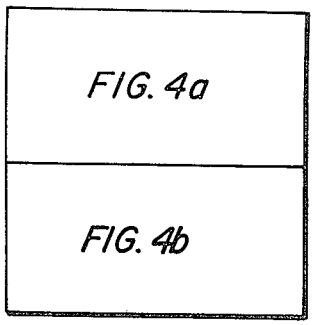

The only major functional block still required to generate a target signal is the target range generator 24 of FIG. 2 which is shown in detail in FIGS. 7a, 7b, and 7c. The function of the target range generator is to establish the range of the simulated target as selected by the simulated operator. Considered as a single functional block, the target range generator requires only one input (a time reference pulse) and produces only one output (a pulse occurring at the desired range of the simulated target). As a convenience for system operation, the target azimuth signal as described in the preceding discussion is used to inhibit operation of the target range generator except at those azimuths where it is desired to produce a target. From a theoretical point of view, the inhibiting could be done before, inside, or after the range generator. It is just a designers choice in this case to put the inhibit circuit at the input so that strictly speaking, the target rang generator has a second input consisting of a target azimuth pulse or azimuth gate signal.

The azimuth gate signal is such that for most of an antenna revolution a zero voltage level is present on one leg of a target range generator inhibit gate 700 (FIG. 7b). When the radar antenna is at an azimuth selected by the simulator operator the azimuth gate signal suddenly drops to −6 VDC, remains in that condition for approximately 55 milliseconds, then returns to zero volts. While the azimuth gate signal level is at −6 VDC, the inhibit gate 700 is open and allows a time reference pulse to be applied to the timing circuitry of the target range generator. Every time the target range generator is triggered, an output pulse causes the transmission of an RF pulse. Fifty-five milliseconds was selected as the duration of the azimuth gate signal because at a mean antenna rotation rate of ten RPM, a three degree sector of space is scanned in that time. A radar was designated as the victim radar which has a beam width of approximately three degrees. The simulated target will be as wide (in azimuth or arc width) as a real target seen by the same radar. When the azimuth gate signal is not present (zero volts level), the azimuth inhibit gate 700 prevents the time reference pulse from being applied to the target range generator. The period of the reference pulse is 2.5 milliseconds (due to a radar PRF of 400). This means that about twenty target pulses will be generated during one azimuth gate period. This corresponds to the multiple "painting" of a target by a real radar if the target is in the antenna pattern for the same time.

A switch S1 is provided in the azimuth gate input leg of the inhibit gate circuit 700. when it is opened, the azimuth gate leg is pulled negative by an internal bias resistor which is the same as a continuous signal permitting passage of the time reference pulse. This causes the target pulse to paint a continuous circle on the display scope of the victim radar. This is useful for initial adjustments and for locating the simulated target when it is confused with real targets. The time reference pulse is a pulse which indicates the receipt of a main bang from the radar. If this pulse were coincident with the trigger which fired the magnetron in radar unit 2, it could be considered as a true $T_o$ pulse with respect to the radar. However, the simulator is a finite distance from the radar, so the time reference pulse will be delayed from true $T_o$ by the amount of the propagation time of the main bag between the radar and the simulator. The positive time reference pulse is applied to an "or" gate 701 in inhibit gate 700 and is inverted and applied to an "and" gate 703. When properly gated by the azimuth gate signal, the negative pulse at gate 703 is inverted and passed out to a monostable multivibrator or delay flop 705. The delay of 705 is set to a value required to compensate for the propagation time which will be explained in more detail later. The output of delay flop 705 is a pulse which goes negative at the receipt of a main bang, stays down from a specified time, then returns to normal awaiting the next main bang some 2500 microseconds later. The positive going portion of the delay flop output signal is connected to a multivibrator 707. This triggers one output of 707 to the positive level (zero volts). This output then becomes the clock time gate signal for a clocked counter 704 and stays on until a target pulse is generated. A target pulse is applied to a second input of 707 and removes the clock time gate signal from clocked counter 704 which then stops running until another time reference pulse gets through the gate inhibit circuit. This prevents several targets from appearing on the same radar sweep at multiples of the selected range. This could occur at certain higher counts while an input pulse is still rippling down the chain. For instance, when the counter is setting at nineteen, the next count starts the transition to twenty, but for an instant a count of ten will be present until every flip flop in the chain has made the transition to the new state. When the clock time gate signal is present, the output frequency of a crystal controlled oscillator 711 in clocked counter 704 is applied to a divider 713 in counter 704 and is changed to an output pulse train with a period of 1.2 microseconds. This time is also equal to 0.1 miles of radar range. Therefore, every ten pulses from counter 704 is equal to exactly one radar mile.

The output of counter 704 is supplied to the input of a gate 714 and to two inputs of a logic circuit connected in the input to the least significant bit flip flop 715 of a first range divide-by-ten counter 706. Having the pulses applied to gate 714 normally has no effect. However, when a target range pulse has been generated and appears at a second input of gate 714, the 0.5 microsecond negative portion of the clocked signal from counter 704 is passed through the gate 714 and is used to shut off the clock time base by applying a positive signal to the second input of multivibrator 707. This leaves 707 preset until the next time reference pulse comes from the gate inhibit circuit 700. A second output of gate 714 is used to trigger a blocking oscillator 724 and eventually cause an RF target pulse to be transmitted. A third output of gate 714 is used to reset all counter stages except the 0.1 mile counter which is preset for a count of one, over the reset line shown.

The output of counter 704 is also applied to the first divide-by-ten counter 706. This counter has previously been preset by the output of gate 714 on the reset line shown so that only nine counts are required to fill it up for the first time, but ten counts are required for all succeeding cycles. This means that counter 706 is preset by one count, or a range anticipation of 0.1 mile is built into the counter. If no other arrangements were made, a target which was desired to appear at a range of 1.0 mile or 2 miles or 3 miles, would appear at 0.9 mile, 1.9 miles, 2.7 miles, etc. Now the function of the delay flop 705, previously discussed, become clear. Enough delay is added by the delay flop so that the total time interval of its delay and the propagation delay between the radar and the simulator is equal to 0.1 mile or 1.2 microseconds.

The remaining counter chains 708, 710, and 712 divide the clocked counter 704 output into one mile, ten mile, and 100 mile pulses. The one mile divide-by-ten counter 706 is a clocked counter as opposed to the conventional ripple counter. This eliminates the small delay between input and output of a ripple counter as the waveform progresses down the chain. Only the 1.0 mile counter is clocked because percentage-wise, the delay becomes insignificant for the 10 mile and 100 mile counters. The delay in the 0.1 mile counter is included in the range delay compensation adjustment in delay flop 705.

To review briefly to this point, the following events have been covered. A main bang pulse is detected, if an azimuth gate is present, and the range delay flip flop 702 is triggered. After some delay, the crystal controlled oscillator 711 in counter 704 starts running and is divided down to 0.1 mile or 1.2 microsecond pulses by the counter 704. These pulses begin filling up the range counters 706, 708, 710, and 712. At some time, the range counters will hold exactly the number of counts representing the desired range of the simulated target which has been manually preset into the range counter by the operator. A set of diode gates (which are built into thumbset digi-switches) monitors the condition of every counter stage in the target range generator. When the selected range is present in digital form in the counters, a pulse appears at gate 714. Gate 714 functions as previously described. The output pulse from 714 to blocking oscillator 724 is shaped by a shaper 720 and an amplifier 722. Here the target width in range (not azimuth) is set to equal the pulse width of the radar being deceived so as to send back a more realistic pulse.

The output of the blocking oscillator 724 goes to a switch S2 so the target can be completely removed at any time by the simulator operator. From switch S2 it is applied to a potentiometer 726 where the required amplitude is set to make the power level of the returned pulse be representative of a real target return. The pulse is then sent to the modulation input of pin modulator 26 (FIG. 3) on a DC voltage level which allows the pin modulator to work over its best dynamic range. From 26 the pulse goes through hybrid 317, pin modulator 28, and an isolation device 315 to the simulator antennas (FIG. 3).

Thus the operator of the simulator can cause a target to appear on radar scope 4 of FIG. 1 at any azimuth and range which he selects. Since no electrical connections between the simulator and the radar are required, the simulator can be positioned near enough to an enemy radar installation to confuse the enemy operators with simulated targets. The simulator is also particularly useful with other types of radar simulators used for training radar operators. Here the effects of enemy electronic counter measures can be duplicated for the benefit of student operators.

Obviously many modifications and variations of the present invention are possible in the light of the above teachings. It is therefore to be understood that within the scope of the appended claims the invention may be practiced otherwise than as specifically described.

We claim:

1. In a radar simulator apparatus, the improvement comprising means for receiving a signal from a radar unit having rotating antenna and a display scope, means for determining the rate of rotation of said antenna from said signal, means for transmitting a target signal to cause a simulated target to appear on said display scope, and means operable with said antenna rotation rate determining means for establishing the azimuth and range of said simulated target, said means for receiving a signal including a pair of spaced apart antennas, said antennas being arranged to intercept a signal from the said rotating antenna of said radar unit.

2. The apparatus of claim 1, and including means for deriving the sum and the difference of signals developed in each of said pair of spaced apart antennas.

3. The apparatus of claim 2, and including azimuth will circuit means responsive to said sum and said difference for determining when the main lobe of the pattern of said rotating antenna is positioned midway between said pair of spaced apart antennas.

4. The apparatus of claim 3, and including antenna pattern leveling means whereby said means for transmitting a target signal is controlled to cause said simulated target to appear on said display scope with the correct intensity notwithstanding the position of the said rotating antenna of said radar unit.

5. The apparatus of claim 4, wherein said means for establishing the azimuth of said simulated target include first presettable counting means responsive to said azimuth null circuit whereby the azimuth of said simulated target may be established by a count preset into said presettable counting means.

6. The apparatus of claim 5, wherein said means for establishing the range of said simulated target include second presettable means responsive to said first presettable counting means whereby the range of said simulated target may be established by setting a count into said second presettable counting means.

* * * * *